United States Patent
Kim

(10) Patent No.: US 8,276,087 B2
(45) Date of Patent: Sep. 25, 2012

(54) METHOD FOR MAKING MULTI-DIVIDED DISPLAY CONTENTS AND SYSTEM THEREOF

(76) Inventor: Gi Yun Kim, Seoul (KR)

( * ) Notice: Subject to any disclaimer, the term of this patent is extended or adjusted under 35 U.S.C. 154(b) by 574 days.

(21) Appl. No.: 12/531,014

(22) PCT Filed: Feb. 26, 2008

(86) PCT No.: PCT/KR2008/001109
§ 371 (c)(1),
(2), (4) Date: Sep. 11, 2009

(87) PCT Pub. No.: WO2008/111743
PCT Pub. Date: Sep. 18, 2008

(65) Prior Publication Data
US 2010/0115406 A1      May 6, 2010

(30) Foreign Application Priority Data
Mar. 12, 2007   (KR) .......................... 10-2007-0023954

(51) Int. Cl.
*G06F 3/048*   (2006.01)
*G09G 5/00*    (2006.01)

(52) U.S. Cl. ........ 715/765; 715/778; 715/788; 715/803; 345/1.1; 345/1.2

(58) Field of Classification Search .................. 715/704, 715/716, 744, 747, 761, 762, 764, 765, 778, 715/781, 788, 803; 345/1.1, 1.2, 2.1, 4
See application file for complete search history.

(56) References Cited

U.S. PATENT DOCUMENTS

| | | | | |
|---|---|---|---|---|
| 5,390,295 | A * | 2/1995 | Bates et al. .................... | 715/789 |
| 5,796,403 | A * | 8/1998 | Adams et al. .................. | 715/803 |
| 2001/0010525 | A1 * | 8/2001 | Fukuda et al. ................. | 345/788 |
| 2002/0067433 | A1 | 6/2002 | Yui et al. | |
| 2002/0087974 | A1 | 7/2002 | Sprague | |
| 2003/0177501 | A1 * | 9/2003 | Takahashi et al. ............. | 725/110 |
| 2005/0024355 | A1 * | 2/2005 | Yagi .............................. | 345/204 |
| 2005/0278698 | A1 | 12/2005 | Verco | |
| 2007/0028173 | A1 * | 2/2007 | Lauder .......................... | 715/717 |
| 2007/0132720 | A1 * | 6/2007 | Kang ............................. | 345/156 |
| 2007/0276903 | A1 * | 11/2007 | Chiang ......................... | 709/203 |
| 2009/0207187 | A1 * | 8/2009 | Lee ............................... | 345/629 |

FOREIGN PATENT DOCUMENTS

KR   20000058435   10/2000

\* cited by examiner

*Primary Examiner* — Tadeese Hailu
(74) *Attorney, Agent, or Firm* — Christopher Paul Mitchell

(57) ABSTRACT

A method for making multi-divided display contents and a system thereof are disclosed. In the method for making multi-divided display contents and a system thereof, a user is able to freely make or edit a multimedia display content by using a DB design system provided on the web and a user interface without a professional skill or knowledge. A new image type can be expressed along with a change in part of the data in the thusly-created multi-divided display contents, a remaking or a change in a display construction combination. In case that the original data cooperating with a XML on a specific divided display in the multi-divided display is being changed in real time, the divided display cooperating with XML in the whole images can be automatically changed depending on the change of the contents.

16 Claims, 7 Drawing Sheets

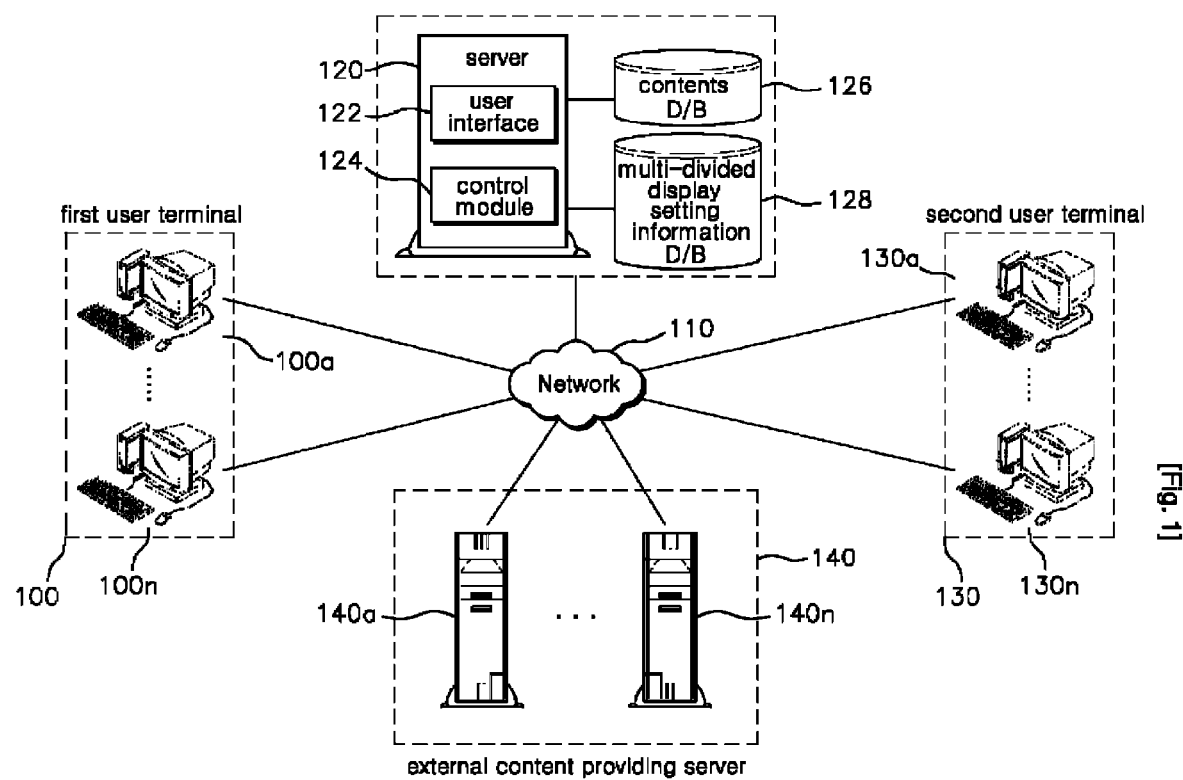

[Fig. 2]
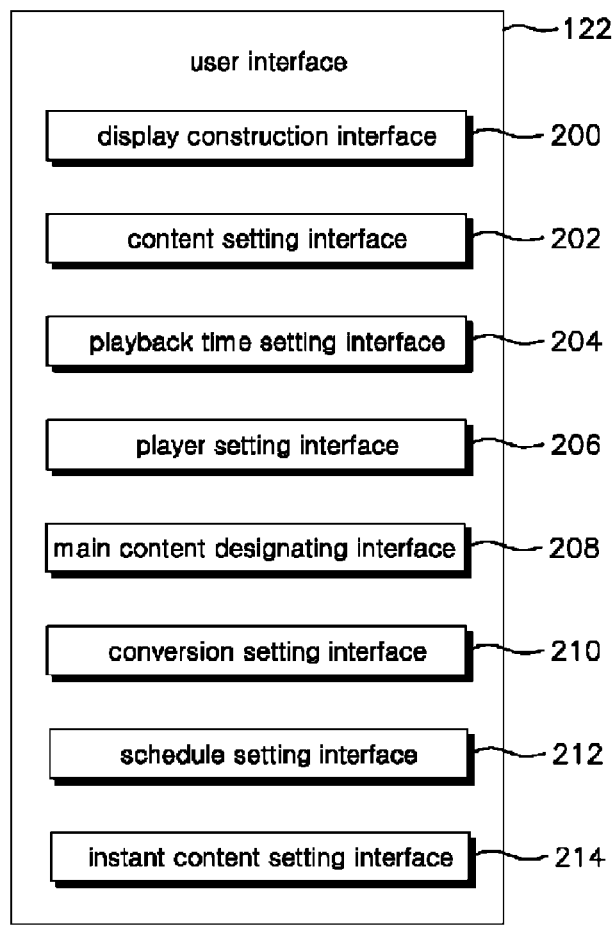
[Fig. 3]
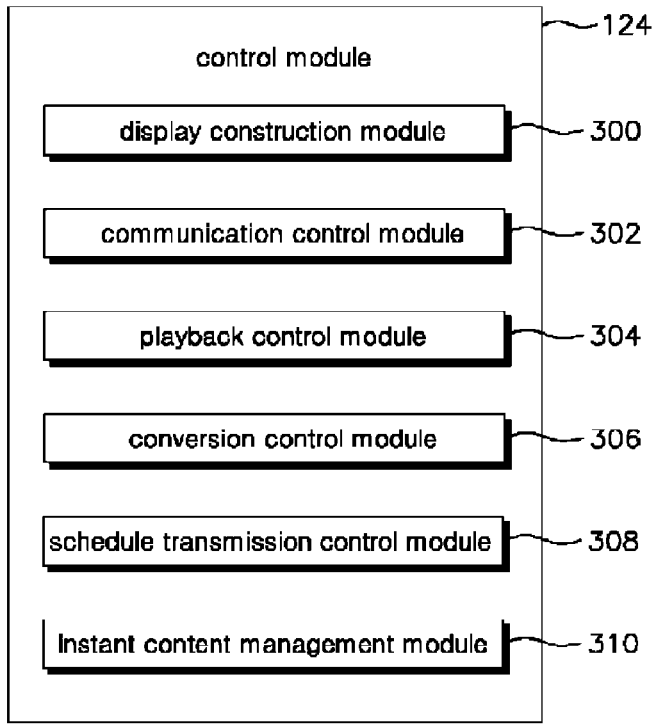

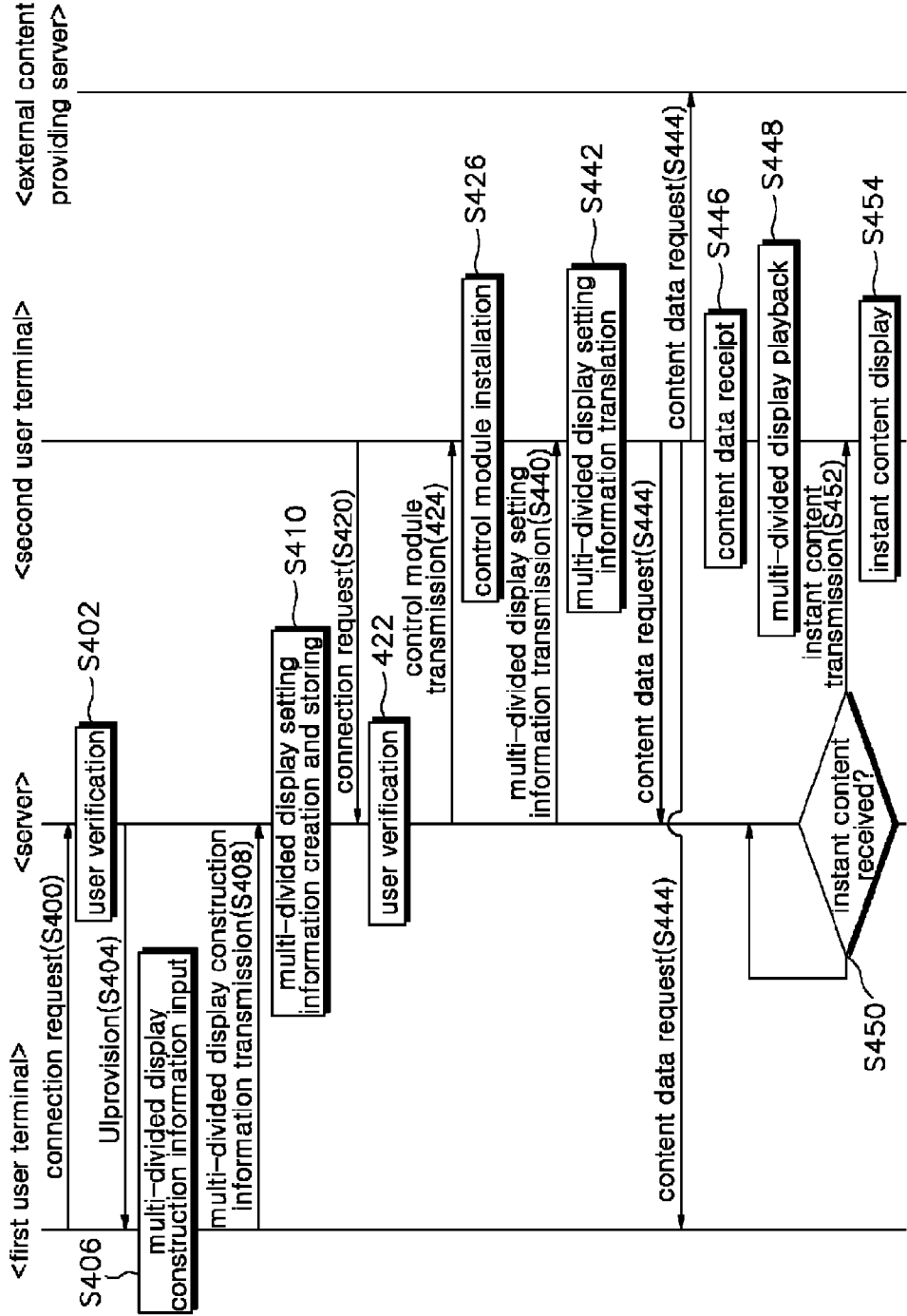
[Fig. 4]

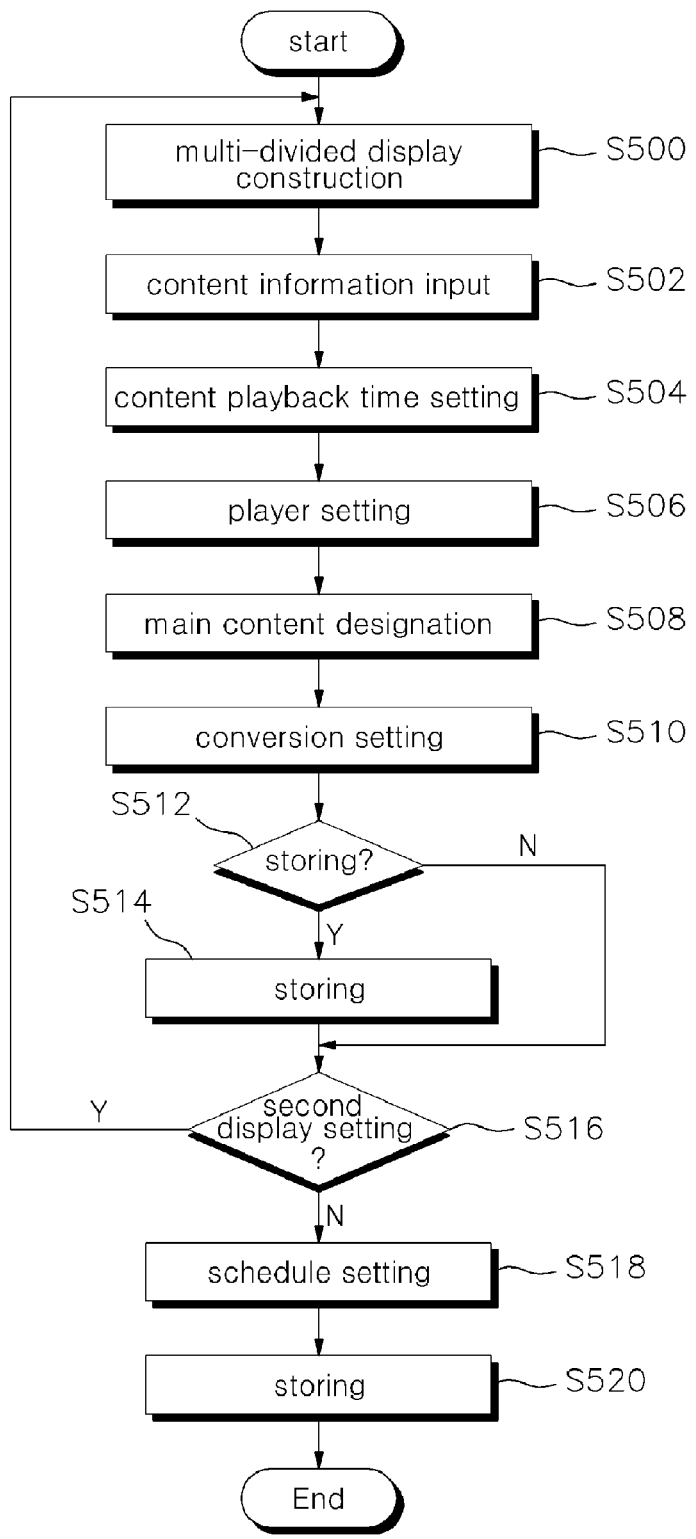
[Fig. 5]

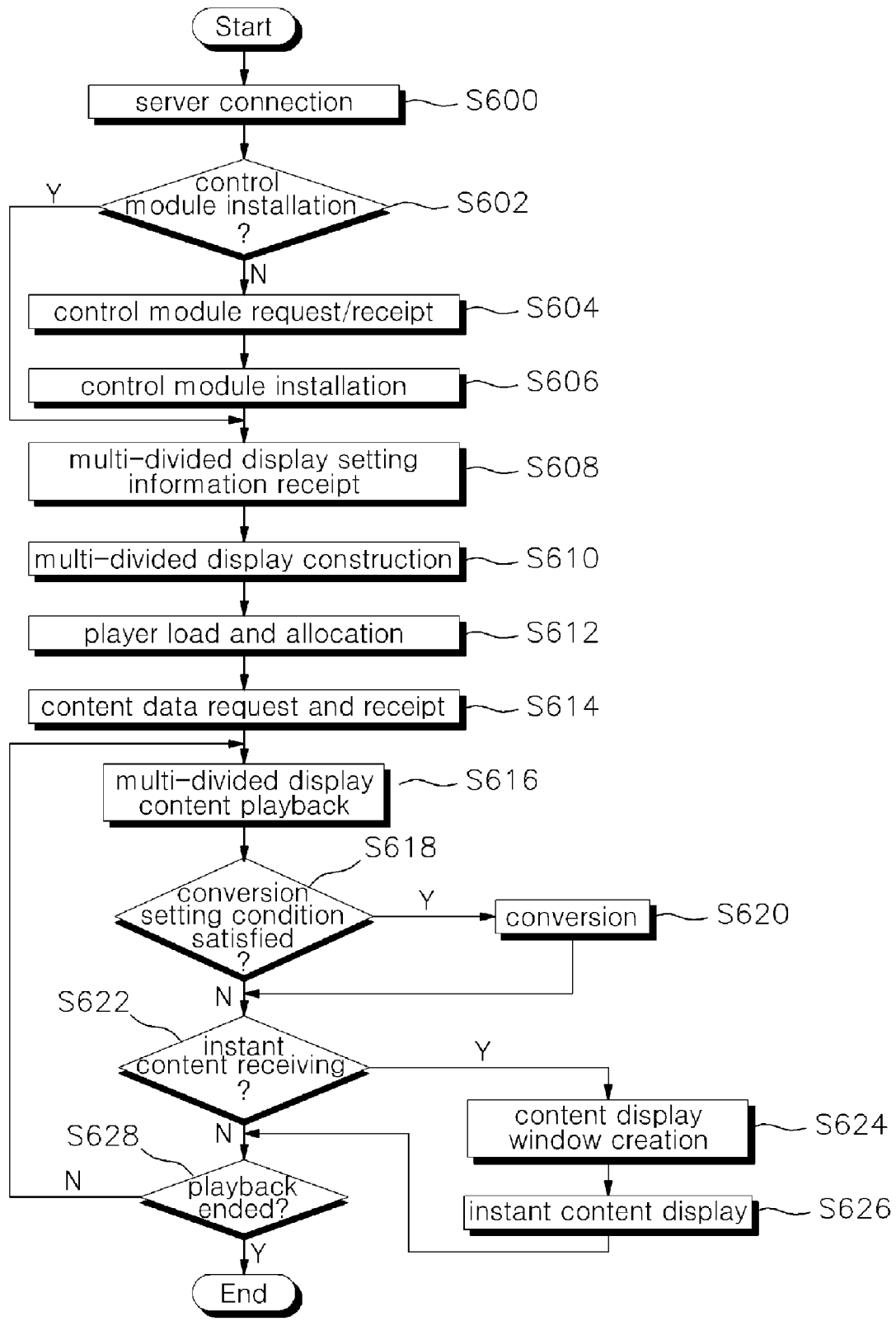
[Fig. 6]

[Fig. 7]
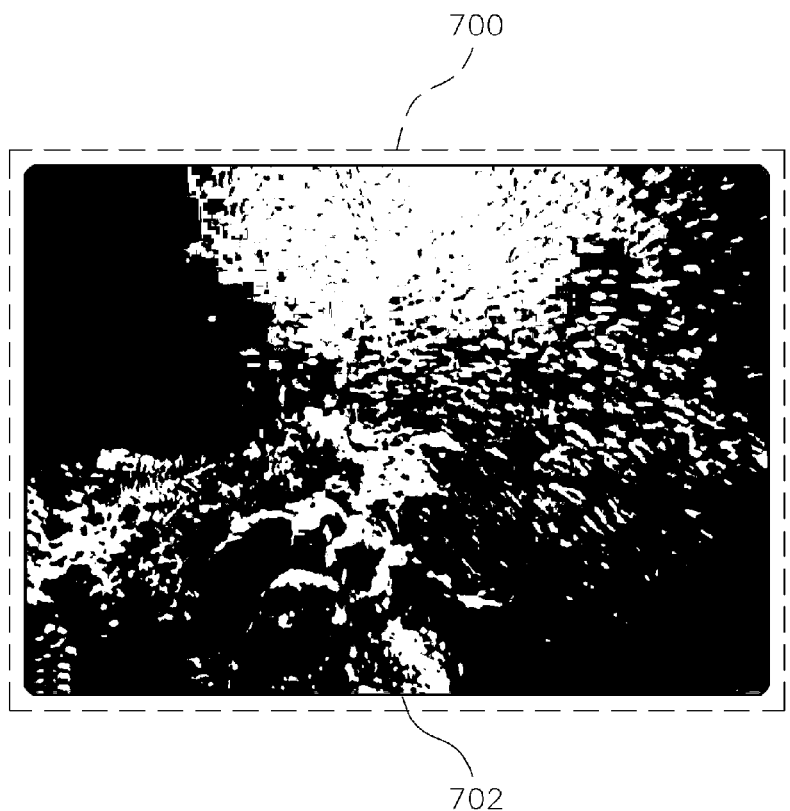
[Fig. 8]
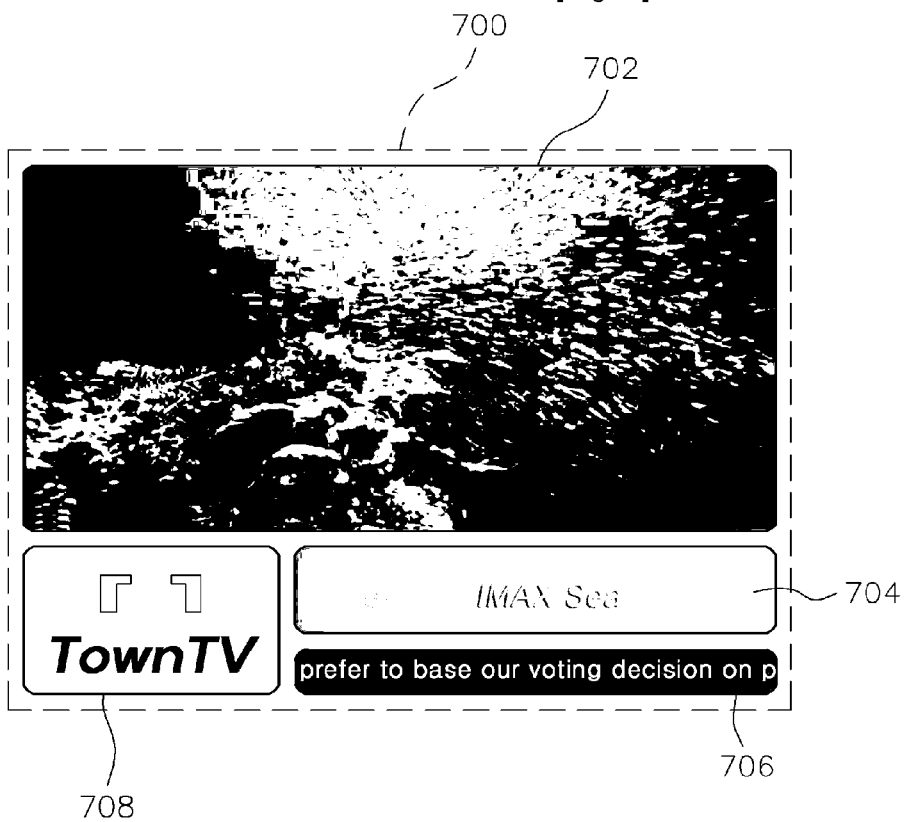

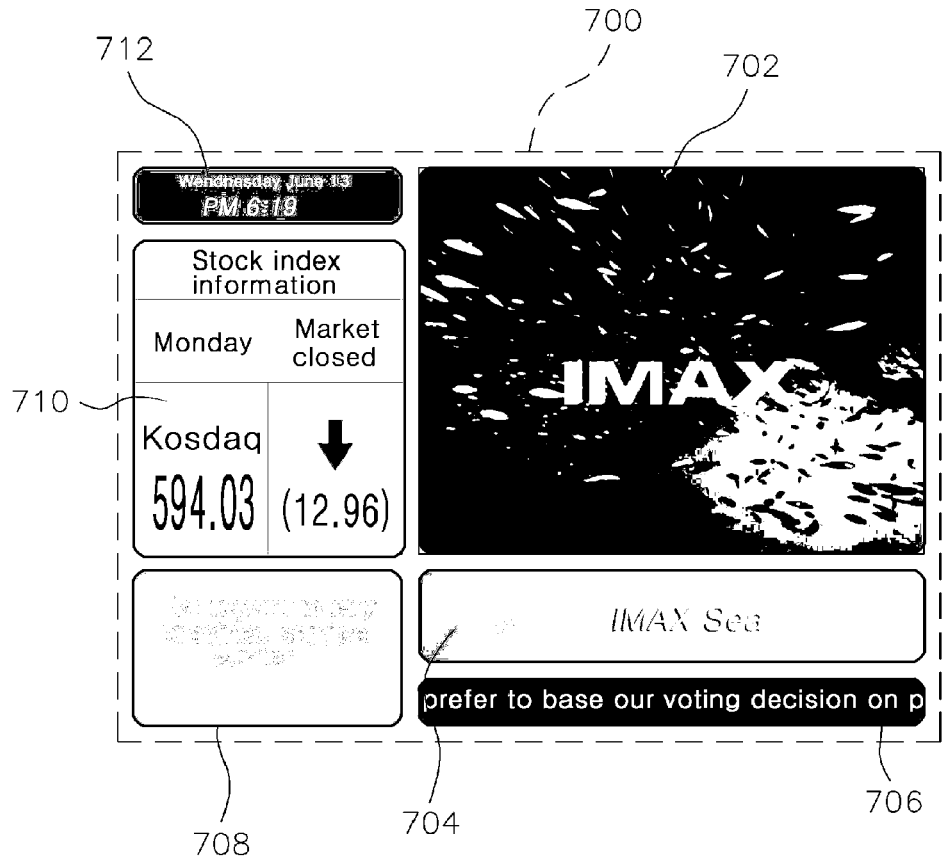
[Fig. 9]

METHOD FOR MAKING MULTI-DIVIDED DISPLAY CONTENTS AND SYSTEM THEREOF

RELATED APPLICATIONS

This application is a 371 application of International Application No. PCT/KR2008/001109, filed Feb. 26, 2008, which in turn claims priority from Korean Patent Application No. 10-2007-0023954, filed Mar. 12, 2007, both of which are incorporated herein by reference.

TECHNICAL FIELD

The present invention relates to a method for making multi-divided display contents and a system thereof, and in particular to a method for making multi-divided display contents and a system thereof in which an ordinary user, who wants to share multimedia contents such as a motion image including UCC (User Created Contents) through a network, is able to easily divide one display into multi-divided displays and to display different multimedia contents on each divided display, respectively, for thereby playing back each multimedia content on its corresponding multi-divided display.

BACKGROUND ART

As an electronic communication technology is greatly advanced, it has become a new trend that an ordinary user seems to share his own created or edited motion image or other information with other users through a network as compared to a conventional trend in which the users just passively receive multimedia contents from others. However, the above method (namely, a conventional multimedia content method in which only one content is displayed on one display for playing back the same) has a problem for substantially satisfying the various demands and expression desires of the users.

In order to overcome the above problems, additional information is further added to one display except a main content with the help of an improved content making technology. In other words, making contents were needed based on a multimedia display (the multimedia display represents a method that one display is formed by using multi-divided displays which are driven independently from one another).

In the above player system for making multi-divided displays, first, the multi-divided displays, which were previously divided in a server system, are edited as one data (content), and are stored in one file. The stored file is transmitted to multiple user terminals, respectively. Second, the server system receives the multiple data (contents) before they are transmitted, and the data are combined through a real-time encoding work by using a hardware or software method and are transmitted to the users. Third, the multiple data (contents) are transmitted to the user terminals through a network, and an exclusive program (player) is installed in the user terminals for decoding the data by using a hardware or software method. In the above methods, multi-divided displays can be even concurrently implemented on the user terminals.

However, the above conventional methods have the following problems. Namely, a content supply service provider (server operation service provider, player manufacture and content supply service provider or something) makes multi-divided display contents in its exclusive way and provides the same in only one way. So, it is not able to provide any functions for allowing a user to directly making multi-divided displays or to set the contents of multi-divided displays for certain purposes.

In addition, conventional hardware equipment (for example, encoder/decoder or something) is too expensive, and a lot of workers are needed. So, with the above methods, it is impossible to satisfy various creative different demands from users.

DISCLOSURE OF INVENTION

Technical Problem

Accordingly, it is an object of the present invention to provide a method for making multi-divided display contents and a system thereof which are able to concurrently express multi-divided display contents on one display by setting a playback time after designating a user's desired display construction and after designating contents, which will be displayed on each display, and a storing path of the content.

Technical Solution

To achieve the above objects, in a multi-divided display content implementation method which includes a first user terminal and a second user terminal connected through a network and a server, there is provided a method for making multi-divided display contents which comprises a step (a) in which the first user terminal is connected with the server, and a multi-divided display construction information is transmitted through a user interface; a step (b) in which after the server receives the multi-divided display construction information, a multi-divided display setting information is created and stored by using the multi-divided display construction information; and a step (c) in which the second user terminal is connected with the server and receives a control module for playing back the multi-divided display contents by controlling the second user terminal in accordance with the multi-divided display setting information and installs the same, and a multi-divided display setting information of a specific content transmitted from the server is received, and the multi-divided display contents are played back.

To achieve the above objects, in a multi-divided display content implementation system which includes a first user terminal and a second user terminal connected through a network, and a server, there is provided a multi-divided display content implementation system which comprises a first user terminal which is connected with the server and transmits a multi-divided display construction information through a user interface provided from the server, and a construction of a multi-divided display content is requested; a server in which a user interface is provided to the first user terminal, and a multi-divided display construction information transmitted through the user interface is received for thereby forming a multi-divided display setting information, and a database is made, and a control module for playing back the multi-divided display content is transmitted by controlling the second user terminal based on the multi-divided display setting information in accordance with a request of the second user terminal, and a multi-divided display setting information of a specific multi-divided display content stored in the database is extracted and transmitted to the second user terminal; and a second user terminal which requests a control module to the server and receives and installs the same, and receives a multi-divided display setting information of a specific content transmitted from the server, and forms a multi-divided display in accordance with the received multi-divided display setting information, and requests the contents to be played back on each divided display, and receives the same, and playbacks the received contents on each divided display.

Advantageous Effects

In the method for making multi-divided display contents and a system thereof according to the present invention, a user is able to freely make or edit a multimedia display content by using a DB design system provided on the web and a user interface without a professional skill or knowledge. A new image type can be expressed along with a change in part of the data (contents) in the thusly-created multi-divided display contents, a remaking or a change in a display construction combination. In case that the original data (contents) cooperating with a XML on a specific divided display in the multi-divided display is being changed in real time, the divided display cooperating with XML in the whole images can be automatically changed depending on the change of the contents.

BRIEF DESCRIPTION OF THE DRAWINGS

The present invention will become better understood with reference to the accompanying drawings which are given only by way of illustration and thus are not limitative of the present invention, wherein;

FIG. 1 is a schematic block diagram of a system for implementing multi-divided display contents according to a preferred embodiment of the present invention;

FIG. 2 is a block diagram illustrating a user interface according to a preferred embodiment of the present invention;

FIG. 3 is a block diagram of a control module according to a preferred embodiment of the present invention;

FIG. 4 is a flow chart of a method for implementing multi-divided display contents according to a preferred embodiment of the present invention;

FIG. 5 is a flow chart of a multi-divided display construction information input process according to a preferred embodiment of the present invention;

FIG. 6 is a flow chart of a process that a multi-divided display content is created on a second user terminal according to a preferred embodiment of the present invention; and FIGS. 7 through 9 are views of the examples of a multi-divided display content manufactured in a method for making multi-divided display contents according to a preferred embodiment of the present invention.

BEST MODE FOR CARRYING OUT THE INVENTION

In the multi-divided display content implementation method which includes a first user terminal and a second user terminal connected through a network and a server, there is provided a method for making multi-divided display contents which comprises a step (a) in which the first user terminal is connected with the server, and a multi-divided display construction information is transmitted through a user interface; a step (b) in which after the server receives the multi-divided display construction information, a multi-divided display setting information is created and stored by using the multi-divided display construction information; and a step (c) in which the second user terminal is connected with the server and receives a control module for playing back the multi-divided display contents by controlling the second user terminal in accordance with the multi-divided display setting information and installs the same, and a multi-divided display setting information of a specific content transmitted from the server is received, and the multi-divided display contents are played back.

In the multi-divided display content implementation system which includes a first user terminal and a second user terminal connected through a network, and a server, there is provided a multi-divided display content implementation system which comprises a first user terminal which is connected with the server and transmits a multi-divided display construction information through a user interface provided from the server, and a construction of a multi-divided display content is requested; a server in which a user interface is provided to the first user terminal, and a multi-divided display construction information transmitted through the user interface is received for thereby forming a multi-divided display setting information, and a database is made, and a control module for playing back the multi-divided display content is transmitted by controlling the second user terminal based on the multi-divided display setting information in accordance with a request of the second user terminal, and a multi-divided display setting information of a specific multi-divided display content stored in the database is extracted and transmitted to the second user terminal; and a second user terminal which requests a control module to the server and receives and installs the same, and receives a multi-divided display setting information of a specific content transmitted from the server, and forms a multi-divided display in accordance with the received multi-divided display setting information, and requests the contents to be played back on each divided display, and receives the same, and playbacks the received contents on each divided display.

MODE FOR THE INVENTION

The method for making multi-divided display contents and a system thereof according to the present invention will be described with reference to the accompanying drawings.

FIG. 1 is a schematic block diagram of a system for implementing multi-divided display contents according to a preferred embodiment of the present invention.

The method for implementing multi-divided display contents according to a preferred embodiment of the present invention will be first described in details with reference to the accompanying drawings.

As shown in FIG. 1, the multi-divided display content implementation method according to a preferred embodiment of the present invention comprises s first user terminal 100, a server 120, and a second user terminal 130.

Here, the first user terminal 100 represents a personal information communication instrument such as a personal computer, palm top computer, PDA or something used by a user who may request a multi-divided display content to the server 120. The second user terminal 130 represents a personal information communication instrument such as a personal computer, palm top computer, PDA or something which is able to playback a certain multi-divided display content by receiving a control module 124 and a specific multi-divided display content setting information from the server 120 and a home appliance which is able to data-communicate through a network 10 such as IP TV. Here, the first and second user terminals 100 and 130 include the elements provided in a common personal information communication instrument such as an input and output unit (not shown), a display unit (not shown), a sound unit (not shown), a main control unit (not shown), a communication unit (not shown), a storing unit (not shown) or something. The above elements are known in the arts, so the descriptions of the same will be omitted.

The server 120 provides a web page to the first and second user terminals 100 and 130 connected through the network 110 and is designed for using a multi-divided display content implementation method according to the present invention and generally comprises a main control unit (not shown), a communication unit (not shown), a display unit (not shown), an input and output unit (not shown), a storing unit (not shown) and something like the elements provided in the conventional web server.

FIG. 4 is a flow chart of a method for implementing multi-divided display contents according to a preferred embodiment of the present invention. The multi-divided display content implementation process according to the present invention will be described with reference to the accompanying drawings.

First, in the multi-divided display implementation method according to the present invention, when a user designates the values corresponding to a type of the whole display (in case of divided display, it corresponds to the number and type of divided displays), a playback time of each display, the type of contents to be inputted into each divided display, a specific date for each divided display, a schedule information and content name for setting the contents to be displayed depending on data or time, and a storing path of each content by using the user interface 122 provided from the server 120. So, the whole display is formed, and the content type-based player is designated in each divided display. As the contents are recombined into one multi-divided display setting information by means of a DB design algorithm (hereinafter, it will be described based on the embodiment constructed depending on a XML-based DB design algorithm, but it is not limited thereto), a desired multi-divided display is implemented.

Namely, the server 120 is previously set so that the user can construct a customized multi-divided display, and the first user terminal 100 forms a multi-divided display by performing a data communication with the server 120 through the network 110 based on a basic web browser depending on a user's operation.

The multi-divided display setting information is used when the second user terminal 130 plays back the multi-divided display content. Namely, the second user terminal 130 downloads a specific multi-divided display setting information from the server 120 and translates the multi-divided display setting information by using the control module 124 and reconstructs the multi-divided display in the second user terminal 130 and receives the contents of the multiplex multi-divided display from the storing path (including multi-divided display setting information), which is distributed, in a real time streaming type or stores into the second user terminal by downloading the same. The second user terminal 130 receives the stored contents and playbacks each content on a corresponding divided display.

The same multi-divided displays set by the user of the first user terminal 100 may be displayed on the entire second user terminals 130 connected through the terminal 110. Unlimited various information may be processed depending on a combination of the displaying contents.

In order to implement a multi-divided display by receiving from a storing place of the data through the network 110 in the second user terminal 130 and combining the same, it is needed to set the values corresponding to a construction type of a multi-divided display inputted by the user of the first user terminal 100, a content displayed on each display, and a storing path of the content, and a playback time of each time, and to integrate and store the values. A certain method for translating the above values is needed.

The multi-divided display content implementation process will be described in details. First, when a user requests a connection to the server 120 by using the first user terminal 100 in a step S400, the server 120 performs a user verification in a step S402. When the user verification is successfully finished, the user interface 122 is provided to the first user terminal 100 in a step S404. At this time, the user interface 122 is formed of some necessary information, namely, a display construction information, a content information of each content played back on each display, a playback time setting information of each content, a main content designation information, a display conversion information, a basic player setting information, a schedule edit information or something for the designations by the user.

The user inputs a construction information of the multi-divided display by using the user interface 122 displayed on the first user terminal 100 in a step S406. The multi-divided display construction information input and transmission process will be described with reference to FIG. 5.

The server 120 receives a multi-divided display construction information from the first user terminal, and integrates the entire values designated by the user into a XML data and stores into the multi-divided display setting information database 128 as a multi-divided display setting information in a step S410.

In addition, the server 120 may further provide an instant content display information in the multi-divided display setting information for temporarily creating the display for displaying the instant contents by further dividing the multi-divided display content playback display of the second user terminal 130.

Here, the instant content display information means an information for temporarily creating a temporal window for displaying the instant contents at a certain position of the multi-divided display content playback display of the second user terminal 130 when an instant content is transmitted to the second user terminal 130 (specified with ID or IP address), and the size, position and created time of the temporal window may be included in the instant content display information.

Next, when another user is connected to the server 120 by operating the second user terminal 130 in a step S420, the server 120 performs a user verification in a step S422. When the verification is successful, the control module 124 is transmitted to the second user terminal 130 in a step S424. At this time, the control module 124 from the second user terminal 130 is installed in the second user terminal 130 and operates as a module, which translates the multi-divided display setting information from the server 120 and controls the second user terminal 130 depending on a multi-divided display setting information.

Namely, in the features of the multiplexing player algorithm based on the server adapted to the present invention, one display is divided into at least two displays, and a schedule is provided to each display for thereby requiring an independent player for driving the data as compared to the conventional single player. Since the data types implemented on each display (motion image, still image, text), playback time, and paths for receiving contents may be different, each player should be independently played. All the divided displays should be played in a desired combination as one multi-divided display by using one module. The above module is a control module 124. In case of the second user terminal 130, the control module 124 is previously installed, so it is not needed to further install.

As the control module 124 is installed, the server 120 transmits a multi-divided display setting information of a specific multi-divided display content to the second user terminal 130, and the second user terminal 130 receives the same and translates the multi-divided display setting information in a step S440.

The second user terminal 130 translates the multi-divided display setting information from the server 120 and forms a multi-divided display depending on a multi-divided display setting information and recognizes the types (motion content, still image content, text content or something) of the contents to be provided to each multi-divided display and loads a dependent player corresponding to the type in a step S442. At this time, the dependent player may use a player installed in the second user terminal 130 or a dependent player stored in the server 120.

The second user terminal 130 reads a XML data with respect to the content designated in each multi-divided display and requests and receives the content data by searching a storing place of each content through the network 110 in steps S444 and S446, and the contents are played back with each player in a step S448.

In a state that the second user terminal 130 is connected with the server 120, when the server 120 receives a transmission request data of the instant content to the second user terminal having a specific internet address from the first user in a step S450, the server 120 translates the received instant content setting information and transmits an instant content display information and instant content to the second user terminal 130 in a step S452, and the second user terminal 130 creates an instant content display window on the multi-divided display and displays the received instant content in a step S454.

FIG. 5 is a flow chart of a multi-divided display construction information input process according to a preferred embodiment of the present invention.

The multi-divided display construction information input process and storing process between the first user terminal 100 and the sever 120 will be described with reference to the accompanying drawings.

First, the user inputs a display construction information through the user interface 122 and divides one display into at least two displays for playing the multi-divided displays by constructing multi-divided displays in a step S500. At this time, the divided displays play as a playback window for playing back the contents designated by the user.

Dividing the display may be performed visually or logically. Namely, it is possible to divide each display independently (visual divide), and it is possible to divide in such a manner that part or all parts of each display are overlapped (logical divide-layer construction).

The process for constructing the multi-divided displays by using the display construction information will be described in details.

The display construction information inputted through the user interface 122 by a user includes a spatial setting value with respect to the number of displays, the size of display, and the position of a main display to be divided, and a time-based setting value for a content playback time setting of a main display and a display conversion effect.

The spatial setting value in the inputted display construction information is used for setting a layout of the display to be divided, and the time-based setting value uses a minus coordinate and a plus coordinate of the display when one display changes to the next display and is used for creating a conversion effect (for example, a sliding effect, a FADE effect or something) of the display.

When one display is changed to the next display in combination of the spatial setting value and the time-based setting value with respect to the display to be divided, it is possible to implement various types of display conversion effects such as a movement, enlargement, contraction, conversion and conversion of the divided displays.

In the display construction information input process, a specific user interface is used for a main display designation, a playback time setting of a main display, and a display conversion effect setting.

When the construction of the multi-divided displays is finished by inputting a display construction information, the user sets a content information such as a storing path, a content name and type which will be played back on each divided display in a step S502. At this time, the contents that the user wants to use are stored in the first user terminal 100 or the server 120 or an external content providing server 140. The user usually inputs a URL address of the place which stores the contents as a storing path of the contents and designates one among a file name of the content or the motion image or still image or text as a type of the contents.

When the input of the content information is finished, the user sets a playback time of the content which will be plated back on each divided display in a step S504, and the player is set in each divided display in a step S506. Here, the player to be used in each display will be called a dependent player. The dependent player may use a player basically installed in the second user terminal 130 or may use by loading the dependent player stored in the server 120 on a browser.

In addition, the user designates a main content among the contents, which will be played back on each divided display. The aspect ratio of each multi-divided display can be automatically adjusted so that a horizontal and vertical ratio of the main content can be maintained in a step S408. When the horizontal and vertical ratio of the multi-divided display, on which the main content is displayed, has a difference as a result of the analysis of the file information of the main content, the server 120 resets the construction of the multi-divided displays set by the user depending on a certain algorithm, so that the horizontal and vertical ratio of the divide display on which the main contents are played back is matched with the horizontal and vertical ratio of the main content.

When the input of the basic information is finished, the display construction conversion or the content conversion, which will be played back on the divided display, is set in a step S510. For example, when the playback time of the main display is longer than the playback time of the auxiliary by comparing the playback times of the main display (divided display on which main content is displayed) and the auxiliary display (divided display on which the contents except the main content is displayed), the conversion of the auxiliary display is set in the loop method, and the contents of the auxiliary display is repeatedly performed during the playback time of the main display. When it is not set in the loop method, it is possible to expand the main display to the area of the auxiliary display after the content playback of the auxiliary is finished. In addition, when the playback time of the main display is shorter than the playback time of the auxiliary display, the conversion of the auxiliary display is set in the stop method. As soon as the playback of the main display is finished, the playback of the auxiliary display is finished as well. When it operates with no stop method, when the playback of the main display is finished, the auxiliary display is expanded to the area of the main display for thereby playing back the auxiliary display. The above examples are provided for only illustrative purposes and are obvious to those who skilled in the art. The conversion setting may be formed using various setting conditions previously known in the art.

When one multi-divided display content is finished through the above processes, the user checks a multi-divided display content created by the one through a preview function, and the content is stored in steps S512 and S514.

When a user wants to set an additional display, the steps S500 through S514 are repeatedly performed, so that as many as the desired displays can be set in a step S516.

The user sets a schedule by using a basic display (initially created multi-divided display content) and an additional display (multi-divided display content created by changing the basic display) having the previously set schedules in a step S418.

Here, the schedule setting represents a process of designating a content which will be displayed on each divided display depending on a specific date, time or day by editing a display layout in which the number and type of the displays are sequentially arranged by making at least one additional display (including multi-divided display) by using a user interface 122 from the server 120, and the designated content is transferred to the second user terminal 130.

So, the second user terminal 130 is able to express various contents even for the same layouts as the contents expressed in the divided displays are changed depending the set schedule as the time passes.

Namely, the schedule setting represents a free operation of the contents, which will be displayed on the second user terminal 130 by designating a specific content with respect to a specific display layout depending on specific date, time or day by the user.

As shown in FIGS. 7 through 9, the schedule setting will be described. FIG. 7 is a view of the construction of a single display content which is conventionally used. As shown therein, there are shown one display 700 in which a content is displayed, and a motion image 702 which is displayed on the display. FIG. 8 is a view of a basic display for expressing different contents by dividing one display into four displays. Namely, the multi-divided display contents are shown for displaying a motion image content 702, an advertisement content 1 704, an advertisement content 2 708, and a news content 706.

FIG. 9 is a view of an additional multi-divided display content which additionally changed the number of the divided displays and its contents so that a stock information content 710 and a time information content 712 can be displayed based on the basic display of FIG. 8. Namely, the user continuously sets three kinds of FIGS. 7 through 9 with respect to the types of the display layout depending on the passes of a specific date and time as a first step by using the multi-divided display content implementation method of the present invention. In a second step, a schedule for setting the contents for each specific date and time on each divided display among the three divided displays is planned and transferred to the second user terminal.

Through the above processes, when the user sets a basic layout so that the display layouts of FIGS. 7 through 9 are repeatedly circulated, and sets the specific content schedule for each display 702, 704, 706, 708, 710 and 712 from Monday to Friday, and sets the schedule so that the other contents are displayed on each display 702, 704, 706, 708, 710 and 712 From Saturday to Friday, the layout of the display may be same, but the other contents can be displayed differently depending on the day.

The above setting conditions may use various setting conditions which are known to those who skilled in the art.

When the schedule setting is finished, the server 120 constructs multi-divided displays by using a multi-divided display construction information of the receiving terminal from the first user terminal 100 and sets the schedule. When the contents to be displayed are set, all the values set by the user are created as one multi-divided display setting information and are stored in the multi-divided display setting information database 128 in a step S520.

FIG. 6 is a flow chart of a process that a multi-divided display content is created on a second user terminal according to a preferred embodiment of the present invention. The process that the multi-divided display contents are played back on the second user terminal will be described.

First, when the second user terminal 130 is connected to the server 120 in a step S600, the second user terminal 130 judges the installation of the control module 124. When the control module 124 is not installed, a control module is requested to the server 120 and is received in a step S602. The control module 124 is installed in a step S606.

When the installation of the control module 124 is completed or the control module is installed, the second user terminal receives a multi-divided display setting information of a specific multi-divided display content from the server 120.

The second user terminal 130 translates the received multi-divided display setting information in accordance with a control of the control module 124. One display on which the multi-divided display contents are played back depending on a multi-divided display setting information is divided for thereby forming multi-divided displays in a step S610. Next, the second user terminal loads a corresponding player in accordance with a player setting which will be used on each divided display and distributes to each divided display in a step S612. Here, the loaded player may be a player which is basically set in the second user terminal 130 and may be a player which is stored in the server 120 and is temporarily loaded onto the web browser of the second user terminal 130.

The second user terminal 130 reads a XML data with respect to the contents designated to each divided display and searches a storing place of each content through the network 110 and requests a content data and receives the same in a step S614. The multi-divided display content is played back by displaying the contents by using the player designated to each divided display in a step S616.

During the playback of the multi-divided display content, the second user terminal 130 judges whether there is a playback time of the content based on a multi-divided display setting information, a display construction conversion based on a user's setting or a content conversion setting which will be played back on the divided display. When there is a conversion setting, it is judged whether the conversion setting is satisfied or not in a step S618, so that the display construction is changed or the contents to be played back is converted in a step S620. When the content itself to be played back is changed, a XML data with respect to a newly designated content is read, and the storing place of each content is searched through the network 110, and the content data is requested, and the contents are played back.

During the playback of the multi-divided display contents, when the second user terminal 130 receives an instant content from the server 120 in a step S622, an instant content display window is created on a multi-divided display on which the multi-divided display contents are being displayed in a step S624. The received instant contents are displayed in a step S626.

Finally, the second user terminal 130 judges a playback completion state. When the playback is completed, the routine is stopped. When the playback is not completed, the steps S616 through 626 are repeatedly performed in a step S628.

FIG. 2 is a block diagram illustrating a user interface according to a preferred embodiment of the present invention, and FIG. 3 is a block diagram of a control module according to a preferred embodiment of the present invention. The multi-divided display implementation system for performing a multi-divided display implementation method will be described in details with reference to FIGS. 1, 2 and 3.

As shown in FIG. 1, the multi-divided display implementation system according to a preferred embodiment of the present invention comprises a first user terminal 100, a network 110, a server 120, a second user terminal 130 and an external content providing server 140.

The network 110 is used as a data communication path between the first user terminal 100, the network 110, the server 120, the second user terminal 130 and the external content providing server 140 and may be formed of a wired or wireless internet network.

The first user terminal 100 transmits a multi-divided display construction information (display construction information, playback time setting information, content information of each content played back on each display, display conversion information, basic player setting information, and schedule edit information) through the user interface 122 provided from the server and requests the construction of the multi-divided display contents.

In particular, the display construction information includes a spatial setting values with respect to the display for displaying and controlling the display which correspond to the number of displays to be divided for setting the layout of the display, the size of a display, and a position information of the display, and a time-based setting value corresponding to a content playback time setting of a main display, a display conversion effect or something.

Here, the spatial setting value with respect to the display to be divided further includes a position value including at least one among an enlargement, contraction, movement, separation, conversion or combination between the displays with respect to at least one display (or layer display) to be divided. The time-based setting value with respect to the display to be divided further includes a time value including at least one among a display time value of the contents depending on the type of the content such as a text, still image and motion image to be displayed at least one display depending on year, month, date or time, and a display conversion time value of the content to be displayed depending on year, month, date or time.

The server 120 provided a user interface to the first user terminal 100 and receives a multi-divided display construction information transmitted through the user interface 122 for thereby forming a multi-divided display setting information in the database 128. The server 120 transmits a control module (it means a module able to playing back the multi-divided display contents by controlling the second user terminal 130 in accordance with a multi-divided display setting information) depending on a request of the second user terminal 130. The server 120 extracts a multi-divided display setting information of a specific multi-divided display content among the multi-divided display setting information of the multi-divided display contents stored in the database 128 and transmits to the second user terminal 130.

At this time, the user interface 122 provided from the server 120 to the first user terminal 100 includes a display construction interface 200 which forms a multi-divided display by dividing one display into at least two displays for playing back the multi-divided display contents, a content setting interface 202 which sets a storing path of the content to be played back on each divided display, a content name and type, a playback time interface for setting a playback tome of the content to be displayed on each divided display, and a player setting interface 206 for setting a player to be used on each divided display.

In a more preferred embodiment of the present invention, the user interface 122 further includes a main content designation interface 208 which designates a main content among the contents to be played back on each divided display, and adjusts a divide ratio of the multi-divided display so that a horizontal and vertical ratio of the main content is maintained, a conversion setting interface 210 which sets a display construction conversion or a content conversion to be played back on a divided display in accordance with a change in a playback time or a user's setting, and a schedule setting interface 212 which extracts a specific multi-divided display construction information depending a user designation condition such as date, time and day in at least one multi-divided display construction information created by changing the multi-divided display construction information which is newly created or is stored, and transmits to the second user terminal 130.

The server 120 according to the present invention further includes an instant content setting interface 214 for temporarily creating a display for displaying an instant content by further dividing the multi-divided display content playback display of the second user terminal 130. The server 120 creates an instant content display information and a multi-divided display setting information and transmits the instant content to the second user terminal 130 by receiving an instant content which requests a transmission to the second user terminal 130 having a specific internet address.

The second user terminal 130 requests a control module 124 to the server 120 and receives and installs the same. The second user terminal 130 receives a multi-divided display setting information of a specific content from the server 120 and forms a multi-divided display depending on the received multi-divided display setting information and requests and a content to be played back on each divided display, so that the received contents are displayed on each divided display.

The control module 124 provided from the server 120 to the second user terminal 130 comprises a display construction module 300 which forms a multi-divided display by dividing one display for playing back a multi-divided display content depending on a multi-divided display setting information, a communication control module 302 which requests a corresponding content data to a storing place of the displayed contents with reference to a storing path, content name and type of the contents to be displayed on each divided display and receives the same, a playback control module 304 which loads a player depending on a player setting used in each divided display, and allocates the loaded player to each divided display, respectively, and plays back each content data outputted from the communication control module 302 using the allocated player in accordance with a playback time set in each divided display, a conversion control module 308 which judges whether there is a playback time of the contents depending on a multi-divided display setting information, a display construction conversion depending on a user's setting or a content conversion setting to be displayed on each divided display, and judges a satisfaction of the conversion setting condition when there is a conversion setting, and converts the display construction or the content to be plated back, and a module 308 which controls a transmission of the content to be displayed on each divided display of the display created by means of the display construction module based on a schedule in relation with a specific date, day or time value in accordance with the communication control module 304.

The control module 124 according to the present invention further divides the multi-divided display contents when an instant content is received from the server 120 and temporarily creates a display for displaying the instant contents and displays the received instant contents.

As described above, in a method for making multi-divided display contents and a system thereof according to the present invention, a multi-divided display implementation system is built in a web site, so that a user can manufacture and provide. So, the contents can be communicated online.

In the method for making multi-divided display contents and a system thereof according to the present invention, a main content and an advertisement are combined by installing a display device in a public place in an advertisement system or the present invention can be used for building an office broadcast system or a personal broadcast station in a public office or a company.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

INDUSTRIAL APPLICABILITY

In the method for making multi-divided display contents and a system thereof according to the present invention, a user is able to freely make or edit a multimedia display content by using a DB design system provided on the web and a user interface without a professional skill or knowledge. A new image type can be expressed along with a change in part of the data (contents) in the thusly-created multi-divided display contents, a remaking or a change in a display construction combination. In case that the original data (contents) cooperating with a XML on a specific divided display in the multi-divided display is being changed in real time, the divided display cooperating with XML in the whole images can be automatically changed depending on the change of the contents.

Sequence Listing multi-divided display, contents, network, UCC, terminals

The invention claimed is:

1. In a multi-divided display content implementation method which includes a first user terminal and a second user terminal connected through a network and a server, a method for making multi-divided display contents, comprising:
   a step (a) in which the first user terminal is connected with the server, and a multi-divided display construction information is transmitted through a user interface;
   a step (b) in which after the server receives the multi-divided display construction information, a multi-divided display setting information is created and stored by using the multi-divided display construction information; and
   a step (c) in which the second user terminal is connected with the server and receives a control module for playing back the multi-divided display contents by controlling the second user terminal in accordance with the multi-divided display setting information and installs the same, and a multi-divided display setting information of a specific content transmitted from the server is received, and the multi-divided display contents are played back.

2. The method of claim 1, wherein said step (a) includes:
   a step (a1) in which one display, which plays back multi-divided display contents, is divided into at least two displays for thereby forming multi-divided displays;
   a step (a2) in which a storing path, content name and type of the contents to be displayed on each divided display are set;
   a step (a3) in which a playback time of the contents to be displayed on each divided display is set; and
   a step (a4) in which a player used on each divided display is set.

3. The method of claim 2, wherein said step (a) further includes a step (a5) in which a main content among the contents to be played back on each divided display is designated, and the divide ration of the multi-divided display formed in the step (a1) is adjusted so that a horizontal and vertical ratio of the main content can be maintained.

4. The method of claim 3, wherein said step (a) further includes a step in which a display construction conversion or a content conversion to be played back on a divided display is set in accordance with a change in the playback time (a6) or a user's setting.

5. The method of claim 4, wherein said step (a) further includes a step (a7) in which a specific multi-divided display construction information is extracted in accordance with a user designation condition such as date, time and day in at least multi-divided display construction information created changing a multi-divided display construction information which is created by performing the steps (a1) through (a6) or which is previously stored, and is transmitted to the second user terminal.

6. The method of claim 1, wherein said step (c) includes:
   a step (c1) in which the second user terminal is connected to the server, and the second user terminal is controlled in accordance with a multi-divided display setting information, and a control module is received and installed for playing back a multi-divided display content;
   a step (c2) in which the second user terminal receives a multi-divided display setting information from the server; and
   a step (c3) in which the second user terminal translates a multi-divided display setting information in accordance with a control of the control module, and one display for playing a multi-divided display content in accordance with the multi-divided display setting information is divided into multi-divided displays for thereby forming a multi-divided display, and a content to be played on each divided display is requested and received from the server, and the received contents are played back on each divided display.

7. The method of claim 6, wherein said step (c3) includes:
   a step (c3.1) in which one display for playing back a multi-divided display is divided in accordance with the multi-divided display setting information for thereby forming multi-divided displays;
   a step (c3.2) in which a player is loaded and allocated to each divided display in accordance with a player setting used in each divided display;
   a step (c3.3) in which a corresponding content data is requested to a storing place of a content to be displayed with reference to a storing path, content name and type of a content to be played back on each divided display and is received;
   a step (c3.4) in which each content data received from the step (c3.3) is played back in accordance with a playback time set in each divided display by using a player allocated in the step (c3.2); and
   a step (c3.5) in which it is judged whether there is a playback time of a content in accordance with a multi-divided display setting information, there is a display construction conversion in accordance with a user's setting, or there is a content conversion setting to be played back on each divided display, and when there is a conversion setting, a satisfaction of the conversion setting condition is judged, and a display construction is converted or a content to be played back is converted.

8. The method of claim 1, wherein said step (b) further includes a step in which a multi-divided display setting information includes an instant content display information which is able to temporarily create a display for displaying an instant content by further dividing a multi-divided display content playback display of the second user terminal.

9. The method of claim 8, wherein said multi-divided display content implementation method further comprises after the step (c);
- a step (d) in which the server receives an instant content as a transmission is requested to the second user terminal having a specific internet address, and it is judged whether the second user terminal is connected with the server;
- a step (e) in which when the second user terminal is connected, the server transmits an instant content to the second user terminal; and
- a step (f) in which the second user terminal receives an instant content, and a multi-divided display content playback display is further divided, and a display for displaying the instant content is temporarily created, and the received instant content is displayed.

10. In a multi-divided display content implementation system which includes a first user terminal and a second user terminal connected through a network, and a server, a multi-divided display content implementation system, comprising:
- a first user terminal which is connected with the server and transmits a multi-divided display construction information through a user interface provided from the server, and a construction of a multi-divided display content is requested;
- a server in which a user interface is provided to the first user terminal, and a multi-divided display construction information transmitted through the user interface is received for thereby forming a multi-divided display setting information, and a database is made, and a control module for playing back the multi-divided display content is transmitted by controlling the second user terminal based on the multi-divided display setting information in accordance with a request of the second user terminal, and a multi-divided display setting information of a specific multi-divided display content stored in the database is extracted and transmitted to the second user terminal; and
- a second user terminal which requests a control module to the server and receives and installs the same, and receives a multi-divided display setting information of a specific content transmitted from the server, and forms a multi-divided display in accordance with the received multi-divided display setting information, and requests the contents to be played back on each divided display, and receives the same, and playbacks the received contents on each divided display.

11. The system of claim 10, wherein said user interface comprises:
- a display construction interface which forms multi-divided displays by dividing one display into at least two displays for playing back multi-divided display contents thereon;
- a content setting interface which sets a storing path, a content name and type of a content which will be played back on each divided display;
- a playback time interface which set a playback time of the content to be displayed on each divided display; and
- a player setting interface which sets a player used in each divided display.

12. The system of claim 11, wherein said user interface further includes a main content designation interface which designates a main content among the contents to be displayed on each divided display and adjusts a divide ratio of a multi-divided display so that a horizontal and vertical ratio of the main content is maintained.

13. The system of claim 12, wherein said user interface further includes a conversion setting interface for setting a display construction or for setting a content conversion to be played back on each divided display in accordance with a change in a playback time or a user's setting.

14. The system of claim 13, wherein said user interface further includes a schedule setting interface which plans a schedule for indicating a specific content on a specific display depending on a user designation condition such as date, time or day in at least one multi-divided display construction information created by changing a multi-divided display construction information which is newly created or previously created and stored, and which transmits the schedule to the second user terminal.

15. The system of claim 14, wherein said control module comprises:
- a display construction module which forms multi-divided displays by dividing one display for playing back multi-divided display contents in accordance with the multi-divided display setting information;
- a communication control module which requests a corresponding content data to a storing place of the contents, which will be played back, and receives the same with reference to a storing path, content name and type of the contents to be played back on each divided display;
- a playback control module which loads a player depending on a player setting to be used on each divided display, and allocates to each divided display, and plays back each content data outputted from the communication control module in accordance with a playback time set in each divided display by using the allocated player; and
- a conversion control module which judges whether there is a playback time of a content in accordance with a multi-divided display setting information, there is a display construction conversion in accordance with a user setting or there is a control conversion setting which will be played back on each divided display, and a display construction can be converted or a content to be played back is converted by judging a satisfaction of the conversion setting condition when there is a conversion setting.

16. The system of claim 15, wherein said server includes an instant content display information for further dividing a multi-divided display content playback display of the second user terminal and temporarily creating a display for displaying the instant contents, and an instant content, which creates a multi-divided display setting information and whose transmission is requested to the second user terminal having a specific internet address, is received, and the instant content is transmitted to the second user terminal, and said control module further includes an instant content management module which further divides a multi-divided display content playback display when an instant content is received from the server, and a display is temporarily created for displaying an instant content, and the received instant contents are displayed.

* * * * *